US008781119B2

(12) United States Patent
Buhr

(10) Patent No.: US 8,781,119 B2
(45) Date of Patent: Jul. 15, 2014

(54) USER-CONTROLLED RANDOM-ID GENERATION FUNCTION FOR SMARTCARDS

(75) Inventor: Wolfgang Buhr, Hamburg (DE)

(73) Assignee: NXP, B.V., Eindhoven (NL)

( * ) Notice: Subject to any disclaimer, the term of this patent is extended or adjusted under 35 U.S.C. 154(b) by 361 days.

(21) Appl. No.: 12/967,059

(22) Filed: Dec. 14, 2010

(65) Prior Publication Data

US 2012/0148041 A1    Jun. 14, 2012

(51) Int. Cl.
*H04L 9/00* (2006.01)

(52) U.S. Cl.
USPC ............................................................ 380/46

(58) Field of Classification Search
USPC ................................................. 380/46; 716/4
See application file for complete search history.

(56) References Cited

U.S. PATENT DOCUMENTS

| | | | | |
|---|---|---|---|---|
| 5,379,344 | A | | 1/1995 | Larsson et al. |
| 5,721,777 | A | * | 2/1998 | Blaze ............................ 380/286 |
| 6,490,637 | B1 | | 12/2002 | Shih |
| 6,647,402 | B1 | | 11/2003 | Chiu |
| 6,804,763 | B1 | * | 10/2004 | Stockdale et al. ............. 711/170 |
| 6,962,530 | B2 | * | 11/2005 | Jackson ........................... 463/29 |
| 7,120,606 | B1 | * | 10/2006 | Ranzini et al. .................. 705/64 |
| 2002/0186838 | A1 | | 12/2002 | Brandys |
| 2003/0188185 | A1 | | 10/2003 | Banerjee |
| 2004/0060979 | A1 | * | 4/2004 | Sukeda et al. ................. 235/375 |
| 2005/0183047 | A1 | * | 8/2005 | Sapiro .............................. 716/4 |
| 2006/0031676 | A1 | | 2/2006 | Vantalon et al. |
| 2007/0169174 | A1 | * | 7/2007 | Critten et al. ...................... 726/3 |
| 2008/0084311 | A1 | | 4/2008 | Salzman |
| 2008/0201265 | A1 | * | 8/2008 | Hewton ........................... 705/67 |
| 2009/0086978 | A1 | * | 4/2009 | McAvoy et al. ............... 380/279 |
| 2009/0144202 | A1 | * | 6/2009 | Hurry .............................. 705/67 |
| 2010/0262841 | A1 | * | 10/2010 | Ekberg et al. ................. 713/193 |
| 2011/0283002 | A1 | | 11/2011 | King |

FOREIGN PATENT DOCUMENTS

| | | | |
|---|---|---|---|
| EP | 1669877 | A | 6/2006 |
| EP | 1965332 | A1 | 9/2008 |
| WO | WO2005/031579 | * | 4/2005 |
| WO | 2009/013702 | A2 | 1/2009 |
| WO | 2009/016540 | A2 | 2/2009 |

OTHER PUBLICATIONS

Non-Final Office Action in related CIP application—U.S. Appl. No. 13/309,419 dated Apr. 26, 2013.
Extended Euroepan Search Report Issued in related EP Application No. 11153351.1-1956/2466509 dated May 6, 2013.
Partial European Search Report, Nov. 22, 2012, in Application No. 11193351.1-2212/2466509.

* cited by examiner

*Primary Examiner* — Teshome Hailu
*Assistant Examiner* — Abiy Getachew

(57) ABSTRACT

A smartcard having a microcontroller kernel and a non-secure memory capable of storing a Random-ID code, where the non-secure memory is electrically coupled to the microcontroller kernel. A random number generator is for generating a new Random-ID code and the random number generator is electrically coupled to the microcontroller kernel. A user interface is electrically coupled to the random number generator so that the user may initiate generation of the new Random-ID code by the random number generator for storage in the non-secure memory.

20 Claims, 2 Drawing Sheets

USER-CONTROLLED RANDOM-ID GENERATION FUNCTION FOR
SMARTCARDS

BACKGROUND

Smartcard, chip card or integrated circuit card is typically any pocket-sized card with embedded integrated circuits. Contactless smartcards typically are RFID (Radio Frequency Identification) cards which suffer from collision problems. Collisions can occur when more than one smartcard is in the vicinity of the reader device. To help address the collision problem, smartcards typically support card ID (Identification) codes.

Two types of ID codes are the fixed Unique ID (UID) and the Random ID. A fixed UID code typically serves two functions. The UID is used in the anti-collision process to distinguish between multiple cards presented in parallel in the vicinity of the reader device and address the cards individually. A UID is also used by the reader device to ascertain the identity of a hardcoded or virtual card device to determine which keys to use when addressing the device. The Random-ID code is typically newly generated at each Power-UP of the card and is stored in RAM. Hence, when a Random-ID code scheme is used by the card, the reader device typically receives a new Random-ID from the card each time the card is brought into the RF-field of the reader device.

Some applications that use fixed UIDs, typically in the customer card area, have been rejected by users or card issuers because a large number of users objected to the full trackability of the smartcards having UIDs from location to location. Particularly for smartcards with RFID or other contactless interfaces, protection against unwanted tracking of interactions with reader devices or tracking of location changes is typically desirable from a user point of view. The use of Random-IDs is recommended from a security and privacy point of view for secure cards to prevent individual cards from being tracked from location to location where the Random-ID code is exposed during the anti-collision process.

DETAILED DESCRIPTION

In accordance with the invention, a smartcard is implemented that combines the capabilities of a fixed UID code with that of a changing Random-ID code by changing the Random-ID code only at specific times under the control of the card user. For arbitrary time periods the smartcard can be used like a smartcard having a fixed UID code, allowing tracking from card reader location to card reader location and allowing collection of the history information about all interactions of the smartcard in the time between two Random-ID code generations.

Embodiments in accordance with the invention provide an integrated circuit card capable of generating Random-ID codes in response to requests by the card user via an external interface.

In embodiments in accordance with the invention, the most recently generated Random-ID code is typically stored in an on-chip non-volatile non-secure memory so that it may be used as a quasi-static ID code or "PseudofixedRandomUID" until the next Random-ID code generation is triggered by the card user. Until a new Random-ID code is generated, the stored Random-ID is used during the anti-collision process each time the card is activated by a reader device, even if the card has experienced a reset event such as a Power-Down or reader RF-field off event. Therefore, until a new Random-ID is generated in response to a user request, the card operates as a card configured to use a fixed UID.

Figure 1:
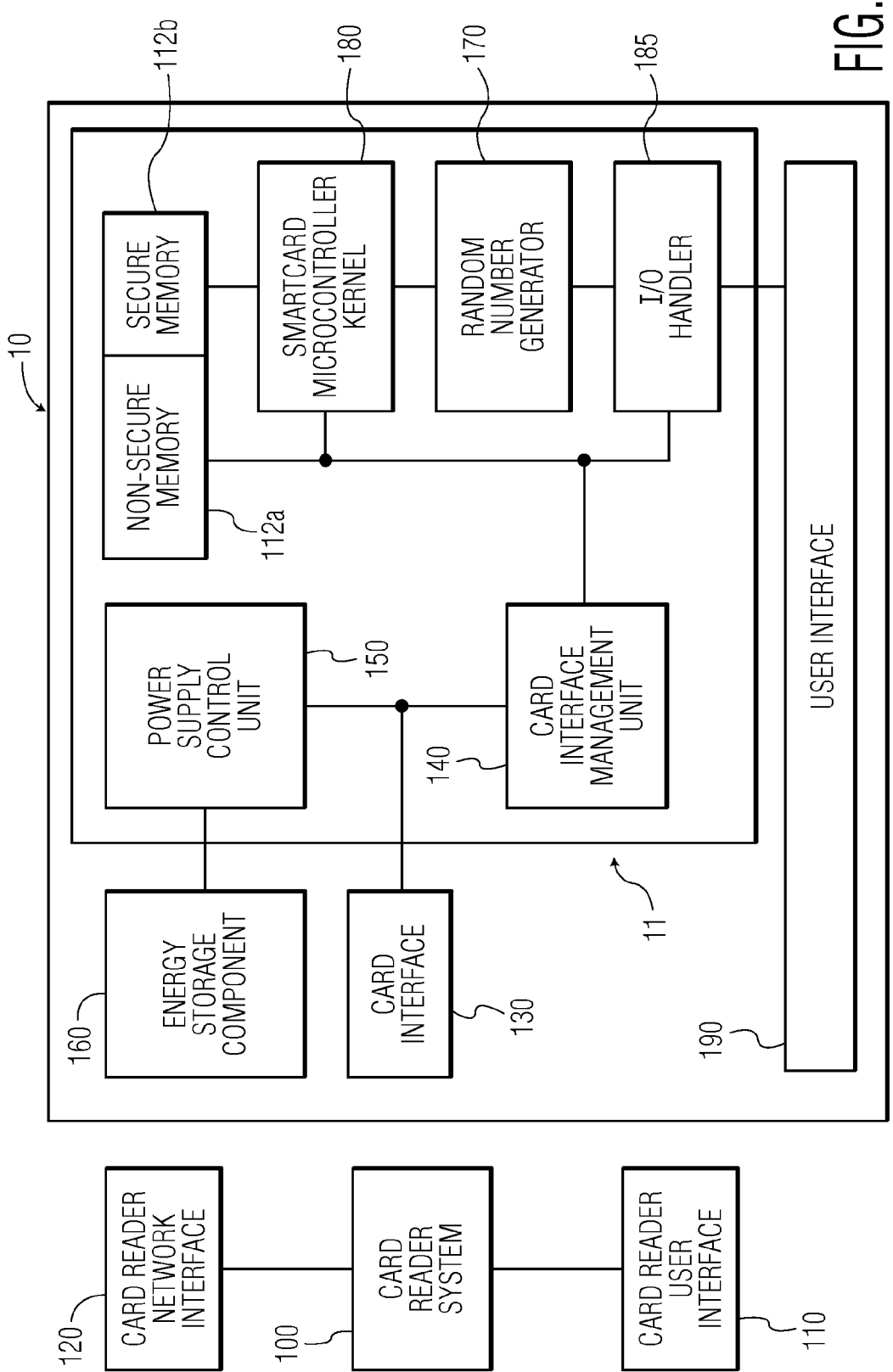
FIG. 1 shows an embodiment in accordance with the invention.

FIG. 1 shows an embodiment in accordance with the invention. Smartcard 10 incorporates user-controlled Random-ID code generation. Smartcard 10 has user interface 190 which allows the card user to generate and store a new Random-ID code, "PseudoFixedRandomUID" in nonvolatile non-secure memory 112a. User interface 190 may be implemented as, for example, a push button or other suitable device electrically coupled to I/O handler 185. Each time the card user pushes the button of user interface 190, smartcard 10 will internally generate a new Random-ID code using random number generator 170 which is electrically coupled to smartcard microcontroller kernel 180. Smartcard microcontroller kernel 180 is electrically coupled to both nonvolatile secure memory 112b and nonvolatile non-secure memory 112a. Secure memory 112b is characterized by having restricted access rights that limit the operation modes during which it may be read or written to by microcontroller kernel 180 (more generally the CPU) and cannot be freely accessed by peripheral blocks such as, for example, a universal asynchronous receiver/transmitter, a direct memory interface or an I/O port. Hence, kernel 180 is able to access both nonvolatile secure memory 112b and nonvolatile non-secure memory 112a separately in operation modes with different security levels. For certain secure operation modes, such as the boot-phase or the smartcard authentication procedure, kernel 180 has access to portions of non-volatile secure memory 112b that are not accessible in other operation modes. This hardware-implemented security feature prevents application software running on kernel 180 from accessing keycodes, error flags and security related data needed in the secure operation mode. Smartcard 10 interacts with card reader system 100 which is electrically coupled to card reader user interface 110 and card reader network interface 120.

User interface 190 may be implemented in an embodiment in accordance with the invention as a dedicated firmware function that can be called and executed by a user software package installed on smartcard 10. This embodiment is typically suitable when smartcard 10 is embedded in a larger communication or identification environment such as, for example, a mobile phone, a portable computer or a tablet computer, and allows the generation and storage of a new Random-ID code to be initiated by a special menu option in the User Menu of the device.

In an embodiment in accordance with the invention, power to smartcard 10 may be buffered by energy storage component 160 which is electrically coupled to power supply control unit 150 that is either integrated into smartcard 10 as shown in FIG. 1 or is part of the environment, for example, a mobile phone or other suitable portable electronic device, in which smartcard 10 is operated. Energy storage component 160 insures that sufficient power is available to initiate and execute the generation of a new Random-ID code for smartcard 10. When the user initiates the generation of a new Random-ID code, energy storage component 160 supplies power to smartcard microcontroller kernel 180 and non-volatile non-secure memory 112a which stores the Random-ID code, "PseudoFixedRandomUID" and application related public data such as, for example, address lists and Internet links, and non-volatile secure memory 112b which stores encryption key data, status flags and error counters. Note that the typical prior-art Random-ID code is a session related ID for smartcard 10 which is regenerated anytime that smartcard 10 is newly introduced to card reader system 100 and deleted at the end of the interaction with card reader system 100. Therefore, the typical prior-art Random-ID code is typically stored in RAM (volatile memory). However, in accordance with the invention, the Random-ID code, "PseudoFixedRandomUID", is fixed over multiple communication sessions with different card reader systems 100 (e.g. at different locations) until the user initiates the generation of a new Random-ID code, "PseudoFixedRandomUID". Because the Random-ID code in accordance with the invention is used like a fixed UID code for user determined periods of time and is transmitted openly by smartcard 10 to card reader system 100 at the start of each communication session, the Random-ID code is stored in nonvolatile non-secure memory 112a.

Nonvolatile secure memory 112b stores session-keys or login codes that are received by smartcard 10 from the Application Environment when smartcard 10 is newly introduced to card reader system 100. Typically the Application Environment includes a SmartCard Reader Terminal which is part of a server-network that centrally controls all transactions of SmartCards using the particular application. Non-volatile secure memory 112b also stores private data generated within the Application Environment. This private data typically comprises articles selected for purchase within a supermarket type of environment, services or pages used with an Internet application and points of sale that have been visited by the user in a shopping mall type environment. In accordance with the invention, such private data should only be accessible by the Application Environment that generated the data and only accessible while the "PseudoFixedRandomUID" under which the private data was created is still valid. The private data is encrypted in a two step approach based on an encryption key stored in nonvolatile secure memory 112b that is diversified using the current "PseudoFixedRandomUID" stored in nonvolatile non-secure memory 112a so that the generation of a new "PseudoFixedRandomUID" by the user invalidates the data stored in non-volatile secure memory 112b.

Energy storage component 160 may include capacitive energy storage that is charged via the RF-field of card reader system 100 or via electrical contact of smartcard 10 with card reader system 100. Capacitive energy storage allows a limited number of user actions before power is exhausted. Capacitive energy storage component 160 needs to provide at least enough energy storage to allow the proper completion or proper termination of an executing Random-ID code generation process in the event card smartcard 10 is abruptly removed out of the RF-field of card reader system 100 or out of electrical contact with card reader system 100.

Typically, the power supply for operating smartcard 10 is obtained via the RF-field from card reader system 100 interacting with card interface 130 or from electrical contact by card reader system 100 with card interface 130. Card interface 130 may include an RF receiver antenna and electrical contact pads for electrically coupling to card reader system 100 in an embodiment in accordance with the invention. Card interface management unit 140 is electrically coupled to card interface 130 and to power supply control unit 150, I/O handler 185, random number generator 170, smartcard microcontroller kernel 180, and memory 112a and 112b.

In an embodiment in accordance with the invention, a back-up battery may be integrated into smartcard 10 which is only used by smartcard core 11 when no external power is available, for example, from card reader system 100. If smartcard 10 is embedded in a larger communication or identification environment, a back-up battery function may be integrated into the communication or identification environment to supply the back-up power. The availability of additional power allows the use of buffered RAM memory in place of non-volatile EEPROM or flash memory for memory 112a and 112b.

In an embodiment in accordance with the invention, smartcard 10 includes an embedded multi-character display as part of user interface 190. The multi-character display can function to provide information relating to the operation of smartcard 10 such as the time of the latest Random-ID code update, the charge status, error codes, or a status/data display for applications currently being executed on smartcard 10.

In an embodiment in accordance with the invention, smartcard 10 includes an encryption capability for secure memory 112b that encrypts or decrypts the contents of that portion of memory 112b that contain the card status information and the UID-related card. The encryption of the UID-related card data typically depends on the current Random-ID code, "PseudoFixedRandomUID", stored in non-volatile non-secure memory 112a. This provides a key diversification for the secured data. Hence, for each new Random-ID code that is generated by the user, the existing contents of the UID related part of secured memory 112b would be invalidated because of the change in the key used for memory access. Therefore, each new Random-ID code generation by the user represents a memory clear of the UID-related portion of nonvolatile secure memory 112b.

In accordance with the invention, the typical smartcard standards need to be modified to accommodate reserved code space for "pseudo UIDs". Typical smartcard standards have reserved code spaces for genuine UIDs and prior-art Random-IDs. In an embodiment in accordance with the invention, the code space (existing smartcard standards define certain coding spaces for different kinds of IDs) for the targeted "pseudo UIDs" is typically defined as separate from the code spaces reserved for genuine UIDs. Genuine UIDs are the unique ID codes for smartcards 10 that are created by the card manufacturer at the time of smartcard manufacture and the Random-ID codes stored in RAM and re-generated at each smartcard reset when smartcard 10 is newly introduced into the proximity of card reader system 100. The "PseudoFixedRandomUID" codes in accordance with the invention are stored in non-volatile non-secure memory 112a and regenerated only at the discretion of the user. This allows implementations of card reader system 100 that when receiving the UID-code from smartcard 10 can distinguish these types of ID codes and adapt their ID handling processes accordingly. The system within which smartcard 10 is used separates the full coding space for a given ID width into separate value spaces where each space is reserved for a specific ID type (Random-ID, UID, pseudo ID). This means that certain bits in the ID code of smartcard 10 indicate which type of ID-code it is.

Figure 2:
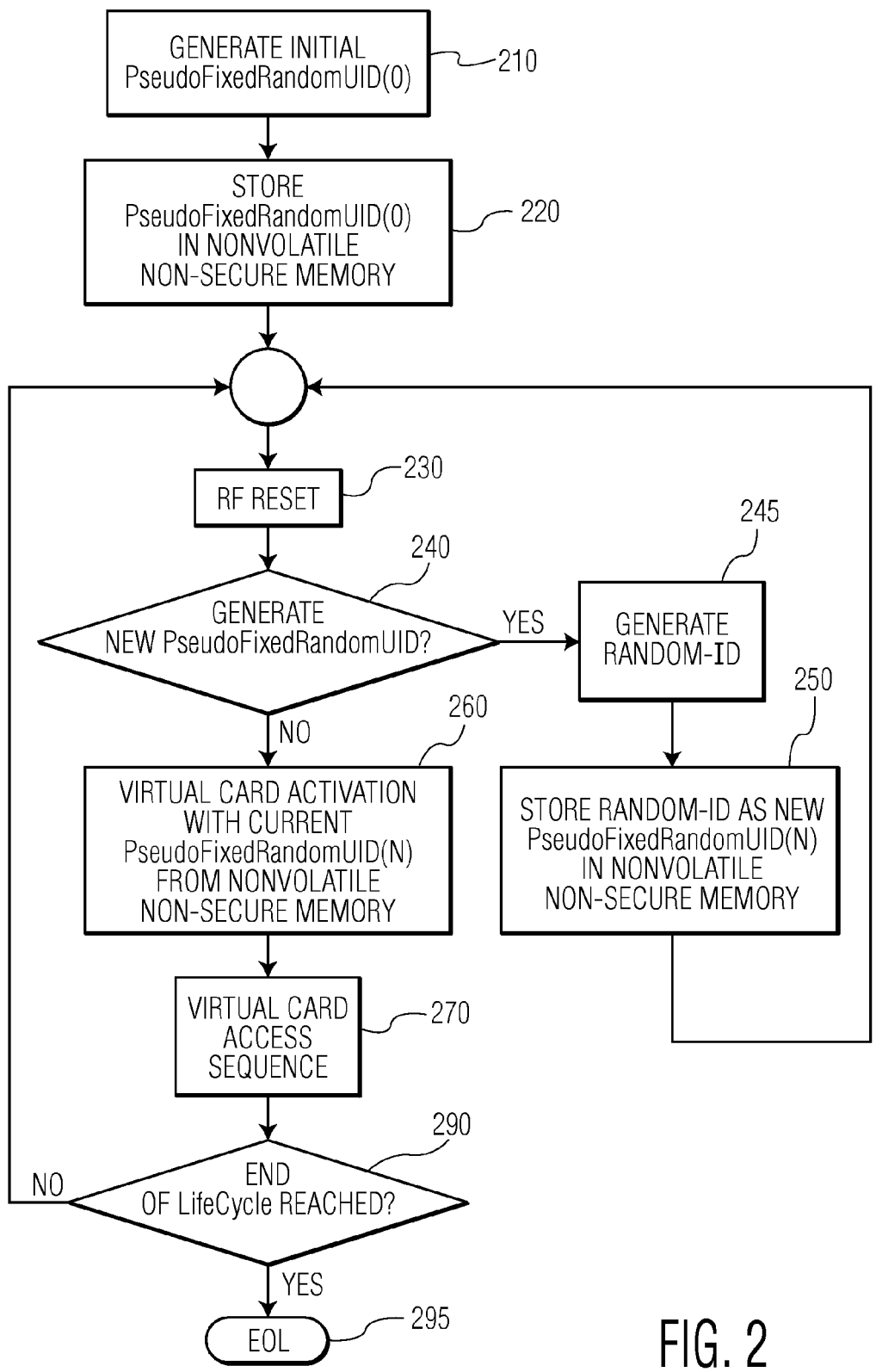
FIG. 2 shows an embodiment in accordance with the invention.

FIG. 2 shows the relevant life cycle of an embodiment in accordance with the invention. In step 210 of the lifecycle, an initial Random-ID code, "PseudoFixedRandomUID(0)" is generated during production or testing of smartcard 10. In step 220, also during production or testing of smartcard 10, "PseudoFixedRandomUID(0)" is stored in nonvolatile non-secure memory 112a. Steps following step 220 are performed once smartcard 10 is in possession of the card user. In step 230, an RF reset is performed. RF reset means that when smartcard 10 enters the RF-field of card reader system 100 or is electrically connected to card reader system 100, a card reset procedure is initiated by smartcard microcontroller kernel 180. In step 240 the card user is given the opportunity to generate and store a new Random-ID code, "PseudoFixedRandomUID". Based on user input through user interface 190, either a Random-ID code is generated in step 245 using random number generator 170 or virtual card activation of smartcard 10 occurs in step 270 with the current "PseudoFixedRandomUID(N)" stored in nonvolatile non-secure memory 112a. Virtual activation occurs when smartcard 10 is selected and activated by card reader system 100 which receives the current "PseudoFixedRandomUID(N)" as the fixed card UID. After the step 270, a check is performed in step 290 to determine if smartcard 10 has reached the end of its lifecycle. If the end of the lifecycle (EOL) has been reached for smartcard 10, smartcard 10 is inactivated and becomes inoperable in step 295. If the end of the lifecycle of smartcard 10 has not been reached, an RF reset is performed in step 230 and smartcard 10 awaits user input via user interface 190 regarding generation of a new Random-ID code in step 240.

If the user has generated a new Random-ID code, the new Random-ID code is stored in nonvolatile non-secure memory 112a as "PseudoFixedRandomUID(N)" in step 250. Subsequent to step 250, an RF reset is performed in step 230 and smartcard 10 awaits user input via user interface 190 regarding generation of a new Random-ID code in step 240.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A smartcard comprising:
   a microcontroller kernel;
   a non-secure memory configured to store a Random-ID code, wherein the non-secure memory is electrically coupled to the microcontroller kernel;
   a random number generator configured to generate a new Random-ID code, wherein the random number generator is electrically coupled to the microcontroller kernel; and
   a user interface electrically coupled to the random number generator such that a user is enabled by the user interface to initiate generation of the new Random-ID code by the random number generator for storage in the non-secure memory.

2. The smartcard of claim 1, further comprising:
   an energy storage unit configured to supply power to the smartcard for generating the new Random-ID code.

3. The smartcard of claim 2, wherein the energy storage unit comprises a capacitive energy storage capability.

4. The smartcard of claim 1, further comprising:
   a nonvolatile secure memory configured to store an encryption key.

5. The smartcard of claim 4, wherein private data stored in the nonvolatile secure memory is encrypted using the encryption key and the new Random-ID code.

6. The smartcard of claim 1, wherein the smartcard is embedded in a larger communication environment.

7. The smartcard of claim 6, wherein the larger communication environment comprises a mobile telephone.

8. The smartcard of claim 1, wherein the non-secure memory is nonvolatile memory.

9. A system having a user-controlled random-id function comprising:
   a card reader system electrically coupled to a card reader user interface;
   a smartcard comprising a microcontroller kernel, a non-secure memory configured to store a Random-ID code, wherein the non-secure memory is electrically coupled to the microcontroller kernel, a random number generator configured to generate a new Random-ID code, wherein the random number generator is electrically coupled to the microcontroller kernel, and a user interface electrically coupled to the random number generator such that a user is enabled by the user interface to initiate generation of the new Random-ID code by the random number generator for storage in the non-secure memory; and a card interface configured to interact with the card reader user interface.

10. The system of claim 9, further comprising:
    a card reader network interface.

11. A method for having a user-controlled random-id function in a smartcard comprising:
    providing an initial Random-ID code for the smartcard and storing the initial Random-ID in a non-secure memory of the smartcard; and
    providing the user with the option of generating a new Random-ID code for the smartcard via a user interface on the smartcard after an RF reset; and
    storing the new Random-ID code in the non-secure memory.

12. The method of claim 11, wherein the smartcard is embedded in a larger communication environment.

13. The method of claim 12, wherein the larger communication environment comprises a mobile phone.

14. The method of claim 11, wherein the new Random-ID code is used together with an encryption key to encrypt private data.

15. A smartcard comprising:
    a non-volatile memory configured to store an ID code, wherein the ID code has a first value;
    a card interface configured to utilize the ID code to enable communication with a smartcard reader;
    a user interface configured to receive, from a user, a request to generate a new value for the ID code;
    a random number generator configured to generate a second value in response to the user interface receiving a request to generate a new value for the ID code; and
    a kernel configured to store the second value in the non-volatile memory in place of the first value.

16. The smartcard of claim 15, further comprising:
    an energy storage component configured to provide power to the smart card.

17. The smartcard of claim 15, wherein the user interface is configured to receive a button press as the request to generate the new value for the ID code.

18. The smartcard of claim 15, wherein the kernel is further configured to: encrypt private information according to the ID code to produce encrypted information; and store the encrypted information in the non-volatile memory.

19. The smartcard of claim 18, wherein storing the second value in the non-volatile memory in place of the first value causes the encrypted information to become inaccessible.

20. A mobile computing device having an embedded smartcard comprising:
    a non-volatile memory configured to store an ID code, wherein the ID code has a first value; a card interface configured to utilize the ID code to enable communication with a smartcard reader; a user interface configured to receive, from a user, a request to generate a new value for the ID code; a random number generator configured to generate a second value in response to the user interface receiving a request to generate a new value for the ID code; and a kernel configured to store the second value in the non-volatile memory in place of the first value.

* * * * *